United States Patent [19]

Ito et al.

[11] 4,187,750
[45] Feb. 12, 1980

[54] MACHINE FOR AUTOMATICALLY CUTTING AN ELONGATE MATERIAL INTO LENGTHS

[75] Inventors: Kenichiro Ito, Monchen-Gladbach; Kurt Schischkoff, Aschaffenburg, both of Fed. Rep. of Germany

[73] Assignee: Yoshida Kogyo K K, Tokyo, Japan

[21] Appl. No.: 888,374

[22] Filed: Mar. 20, 1978

[30] Foreign Application Priority Data

Mar. 30, 1977 [DE] Fed. Rep. of Germany ....... 2714169

[51] Int. Cl.² ............................................ A44B 19/42
[52] U.S. Cl. ........................................ 83/67; 83/222; 83/257; 83/276
[58] Field of Search ................. 83/203, 204, 205, 208, 83/222, 241, 244, 247, 257, 276, 278, 63-67

[56] References Cited
U.S. PATENT DOCUMENTS

| 2,029,726 | 2/1936 | Laabs | 83/66 |
|---|---|---|---|
| 2,290,138 | 7/1942 | Bridges | 83/257 X |
| 2,424,555 | 7/1947 | Curtis | 83/67 X |
| 3,283,631 | 11/1966 | Strom | 83/247 X |
| 3,512,439 | 5/1970 | Kallenberg et al. | 83/250 X |
| 3,629,926 | 12/1971 | Maeda et al. | 29/207.5 |
| 3,664,222 | 5/1972 | Early | 83/257 X |
| 3,735,657 | 5/1973 | Schmidt | 83/222 |
| 4,033,215 | 7/1977 | Schmidt | 83/204 |

Primary Examiner—J. M. Meister
Attorney, Agent, or Firm—Bucknam and Archer

[57] ABSTRACT

A machine for cutting a continuous material of elongate length into predetermined lengths comprises conveying means and cutting means operatively associated therewith, the conveying means being rotatable by an angular amount corresponding to the length of a piston of pneumatic ram, and the cutting means being actuated after a preselectable integral number of steps of movement of the conveying means. The operation of the machine is remotely controlled by a pneumatic circuit arrangement.

7 Claims, 3 Drawing Figures

MACHINE FOR AUTOMATICALLY CUTTING AN ELONGATE MATERIAL INTO LENGTHS

BACKGROUND OF THE INVENTION

1. Field of the Invention

The invention relates to a machine for automatically cutting an elongate material into lengths.

2. Prior Art

Cutting machine of the above type are know, wherein the elongate material is conveyed to a cutting means by means of grippers which are displaced along the conveying path by means of hydraulic or pneumatic actuators. The maximum length which can be cut off is determined by the stroke of the actuator. Therefore, very large machines are required for cutting long individual products. Moreover, another gripper is necessary for holding the cut end of the continuous material before the next cut can be performed.

SUMMARY OF THE INVENTION

According to the present invention, a conveyor roller mounted on a base is driven by a first actuator having on its piston rod a rack held in mesh with a freewheeling pinion mounted on a shaft of the conveyor roller, the conveyor roller being rotatable during the forward stroke of the piston rod for feeding an elongate material a predetermined interval, and being nonrotatable during the rearward stroke of the piston rod. A second actuator mounted on the base supports on its piston rod a cutter blade for cutting off the elongate material fed by the conveyor roller. There is a fluid drive circuit for alternately driving the first and second actuators and for cycling operation of the first actuator before the second actuator is energized, so that the elongate material can be continuously fed for a desired length before it is cut off. A support table extends substantially tangentially with respect to the conveyor roller, and a guide block is disposed in spaced relation to the support table, thereby providing a passageway therebetween in which the elongate material fed by the conveyor roller is held in place for being severed by the cutter blade. A stop mechanism automatically deenergizes the fluid drive circuit when a breakage in or an end of the elongate material or any relatively rigid portion on the elongate material is sensed prior to its arrival at the conveyor roller.

An object of the present invention is to provide a machine for automatically cutting an elongate material into lengths, such machine being compact irrespective of a desired length of the material to be cut off.

The above and other objects, features and advantages of the present invention will become apparent from the following description when considered in connection with the accompanying drawings in which a preferred embodiment is shown by way of illustrative example.

DETAILED DESCRIPTION

Figure 1:
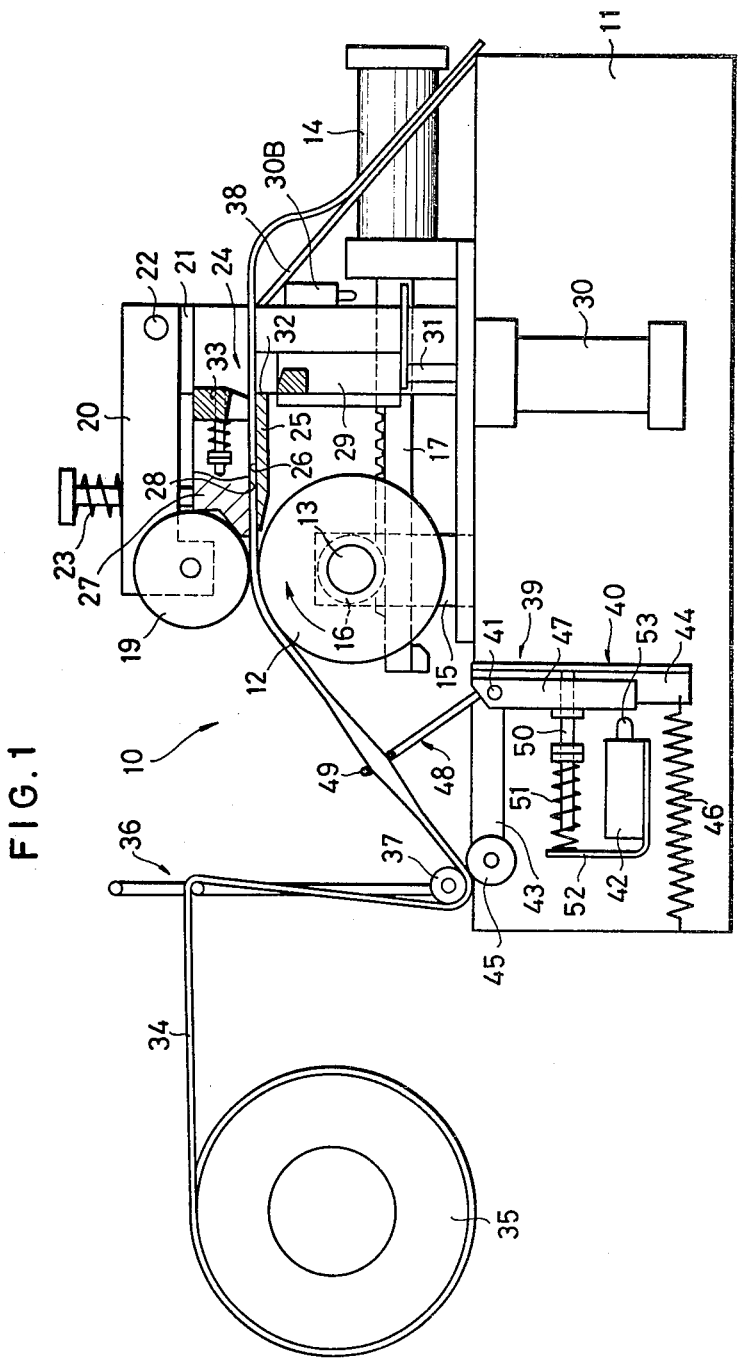
FIG. 1 is a side elevational view, with portions illustrated in cross section, of a machine constructed in accordance with the invention.

A machine according to the invention, illustrated in FIG. 1 and generally indicated at 10, is particularly useful for cutting off an elongated narrow web that is relatively semi-rigid, such as a pair of intermeshed slide fastener stringers with a stringer chain. The cutting machine 10 includes a base 11 on which is supported a conveyor roller 12 which is rotatable with a horizontal shaft 13 journaled in an upstanding bracket 15 mounted on the base 11. When the machine 10 is put to use for severing slide fastener stringers, it is preferable to provide the conveyor roller 12 with a circumferential groove for receiving therein a slide fastener chain. On and around the shaft 13 of the roller 12 is mounted a freewheeling pinion 16 which is held in mesh with a toothed rack 17 connected to the piston rod 18 (FIG. 2) of a horizontal pneumatic actuator or ram 14 mounted on the base 11. As the piston rod 18 of the ram 14 is driven out, the rack 17 drives the pinion 16 to rotate the roller 12 clockwise as viewed in FIG. 1 by an angular amount which corresponds to the length of the stroke of the piston. Conversely, as the piston rod 18 is retracted, the roller 12 remains stationary or nonrotating on account of the freewheel action of the pinion 16.

Above the conveyor roller 12 and parallel thereto, there is disposed an idler roller 19 supported on the free end of an arm 20 that is pivotally supported at the other end on an upright support 21 by means of a pin 22 extending parallel to the shaft 13 and the shaft on which the idler roller 19 is rotatable. The arm 20 is urged downwardly toward the base 11 by a spring 23 so as to press the roller 19 against the conveyor roller 12.

The machine 10 includes a cutting means 24 comprising a horizontal support table 25 fixed to the upright support 21, the table 25 having an upper surface 26 extending substantially in a tangential relation to the conveyor roller 12, and a guide block 27 fixed to the support 21 and having a lower surface 28 which is spaced upwardly from the upper surface 26 of the support table 25 by a distance corresponding to the thickness of an elongate web material to be severed, thereby providing a passageway for the material. The cutting means 24 also includes a first cutter blade 29 fixed to the end of the piston rod 31 of a vertical pneumatic actuator or ram 30 mounted on the base 11. Upon actuation of the ram 30, the first cutter blade 29 is movable along and in a vertical path which extends across the passageway between the support plate 25 and the guide block 27, the cutter blade 29 being slidable in contact with an edge 32 of the support plate 25. Adjacent to the guide block 27, there is disposed a second cutter blade 33 which is spring-loaded away from the block 27 into the vertical path in which the first cutter blade 29 is reciprocatable. Thus the first cutter blade 29 coacts with the edge 32 and with the second cutter blade 33 in cutting off the elongate material.

A continuous web material 34 is unwound off from a supply drum 35 and is guided by a guide 36 to travel around a first roll 37 rotatable on the guide 36. The narrow web 34 is pulled by the conveyor roller 12 and the idler roller 19 to pass between them into the passageway between the support table 25 and the guide block 27 for being severed by the cutter blades 29 and 33, the cut pieces being discharged down a chute 38 out of the machine 10.

There is provided a mechanism 39 on the base 11 for automatically stopping the operation of the machine 10 when the narrow web 34 breaks or its end is reeled out of the drum 35 and arrives at a predetermined position located upstream of the conveying roller 12. Furthermore, the machanism 39 is also actuatable when adhesive tapes connecting a plurality of web pieces into an elongate narrow material are about to enter the machine 10. The stopping mechanism 39 comprises an L-shaped lever 40 pivotally mounted on a pin 41 secured to the base 11, the lever 40 having a horizontal leg 43 and a vertical leg 44. The horizontal leg 43 has a second roll 45 rotatable on its free end and positioned beneath the first roll 37. To the free end of the vertical leg 44 is attached a tension spring 46 that biases the lever 40 in a direction to press the second roll 45 against the first roll 37. A vertical arm 47 is pivotally mounted at one end to the pin 41, the arm 47 supporting a feeler member 48 which has a ring 49 (better shown in FIG. 2) located upstream of the rollers 12 and 19. The vertical arm 47 supports a horizontal rod 50 one end of which is engageable with the vertical leg 44. The other end portion of the rod 50 carries a compression spring 51 that acts on a bracket 52 on the base 11 so as to urge the above-mentioned one end of the rod 50 to be held against the vertical leg 44. A safety switch 42 is mounted on the bracket 52, the switch 42 having a feeler 53 extending toward the distal end of the vertical arm 47 substantially in a direction normal to the arm 47.

Figure 2:
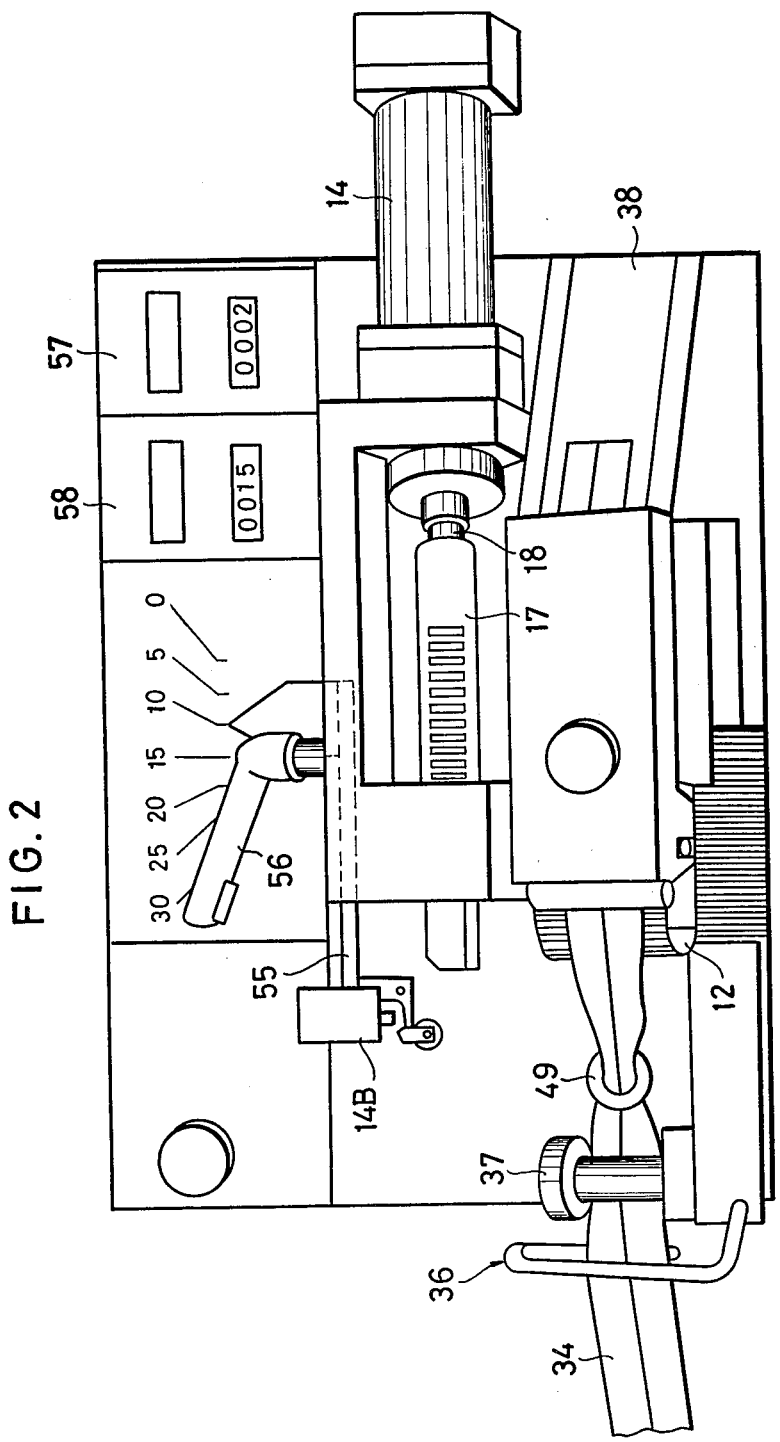
FIG. 2 is a plan view of the machine illustrated in FIG. 1.

The elongate web 34 as it is supplied from the drum 35 to the machine 10 proper is sandwiched between the first and second rolls 37 and 45 to keep them spaced apart to the extent that the vertical arm 47 is spaced from the feeler 53 of the safety switch 42. As soon as an end of the material 34 has passed the rolls 37 and 45, the roll 45 is displaced upwardly into contact with the roll 37 under the force from the spring 46, whereupon the distal end of the arm 47 engaged the feeler 53 and energizes the safety switch 42, thereby stopping the machine 10. The ring 49 has a diameter smaller than the width of the web material 34 such that it will cause the material 34 to flex and pass therethrough as shown in FIG. 2, but will prevent any portions on the material 34 that are more rigid than the material 34 itself from flexing and passing therethrough. Such rigid portions may be superposed and bonded end portions of a plurality web pieces that make up the elongate material 34. Accordingly, when such rigid portions reach the feeler ring 49, the feeler member 48 is angularly displaced about the pin 41, thereby forcing the vertical arm 47 against the bias of the spring 51 until the arm 47 actuates the safety switch 42 which then switches off the machine 10.

Figure 3:
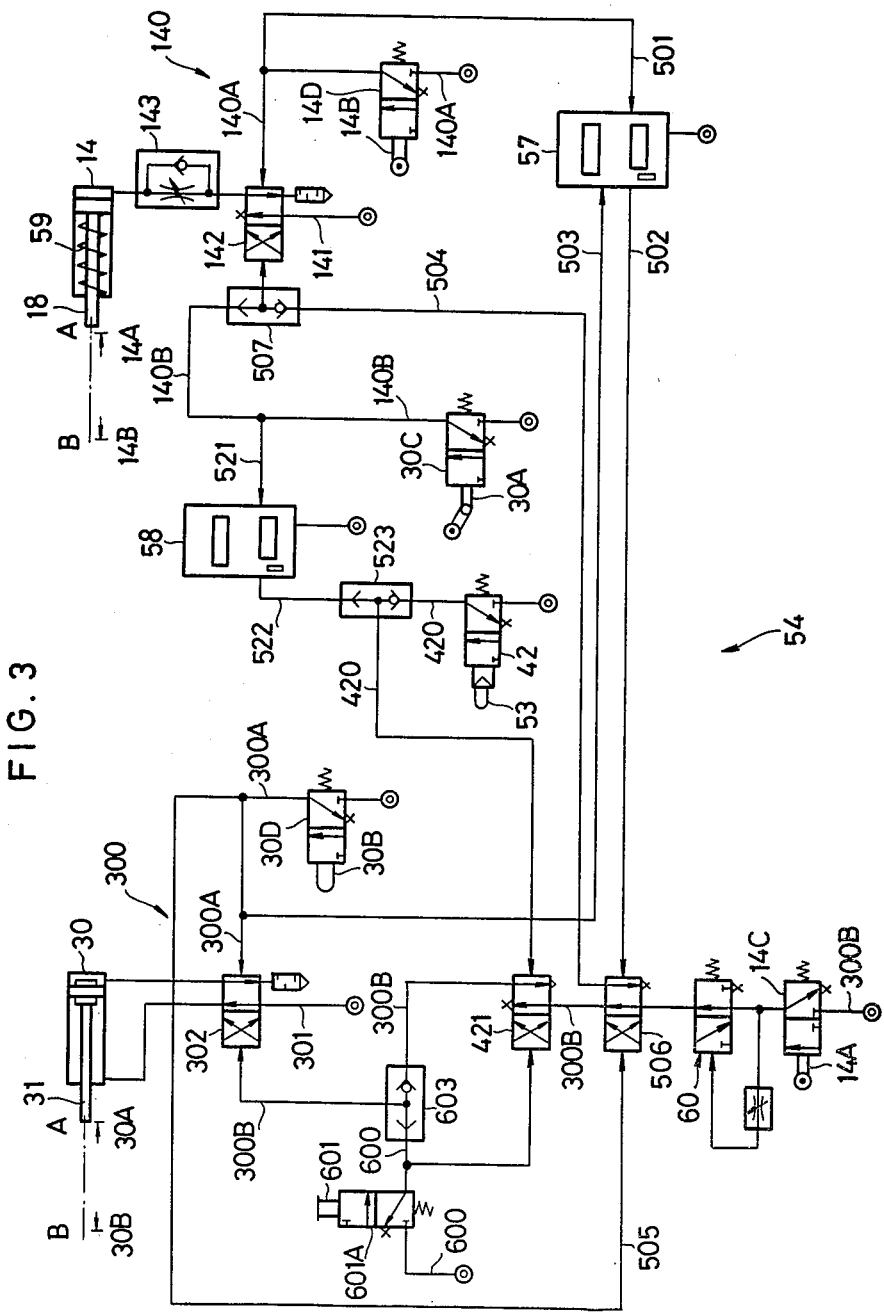
FIG. 3 is a pneumatic circuit diagram of a control system for the machine.

There are provided a pair of limit switches 30A,30B (schematically shown in FIG. 3) that can be acted on by the pneumatic ram 30, and a pair of limit switches 14A,14B (schematically shown in FIG. 3) that can be acted on by the pneumatic ram 14, these limit switches being provided for the control of pneumatic circuit 54 illustrated in FIG. 3. The limit switch 14B (FIG. 2) is mounted on an indicator arm 55 which is movable in a direction parallel to the rack 17 and can be fixed in position by a securing lever 56. Thus, the stroke of the piston rod 18 is as adjustable as the arm 55 is movable.

In FIG. 2 a stroke repetition counter 57 for the ram 14 is shown as well as a piece counter 58 for counting the pieces cut off. The components 55,57 and 58 will be further explained in connection with FIG. 3.

In FIG. 3 a pneumatic circuit arrangement for the cutting machine of FIG. 1 is shown.

The rams 30 and 14 are connected respectively with pneumatic circuits 300 and 140 which have respective drive lines 301 and 141 including four-way valves 302 and 142, respectively. Depending on the positions of the valves 302 and 142, the piston rods of the rams 30 and 14, respectively, are retracted to a position A or driven out to a pistion B. The conveyor ram 14 contains a spring 59 which urges the piston rod toward the position A. Compressed air can only act on the piston rod of the ram 14 to drive the rod toward the position B. Between the ram 14 and the valve 142 a controllable throttle valve 143 is connected, by which the outward speed of the piston can be controlled. For the return movement of the piston, however, the throttle valve is bridged by means of a check valve.

For the valves 302 and 142 two control circuits 300A,300B and 140A,140B, respectively, are provided. By means of the control circuits 300A and 140A the valves 302 and 142 can be switched over for retracting the piston rods toward the positions A. By means of the control circuits 300B and 140B the valves 302 and 142 can be switched over for driving out the piston rods toward the positions B.

The limit switches 30A,30B and 14A,14B respectively for the rams 30 and 14 respond as soon as the respective piston is in the position A and in the position B. The limit switches 30A,30B and 14A,14B are arranged in the control circuits 300,140. If the limit switches 30B and 14B respond, they close the control circuits 300A and 14A for switching back the valves 302, 142. The limit switches 30A and 14A detecting the position A of the piston rods are situated respectively in the control circuits 140B and 300B which operate to move the respective piston rods toward position B.

The limit switch 30A is a quick-action switch which actuates a valve 30C, while the limit switch 14A actuates a valve 14C that controls a pilot valve 60 which closes automatically a predetermined time after actuation of the valve 14C. The limit switch 30B energizes a valve 30D and the limit switch 14B energizes a valve 14D.

Further, in the control circuit 300B a four-way valve 421 is disposed between the valve 302 and the valve 14C. The valve 421 is controlled by a start circuit 600 and a stop circuit 420. The stop circuit 420 includes the safety switch 42. The start circuit 600 includes a start switch 601 which actuates a valve 601 A and is connected in the control circuit 300B between the valve 421 and the valve 302 through a shuttle valve 603.

The pneumatic circuit arrangement thus far described would provide an operative system. However, it is preferred that the following components should also be included.

The piece counter 58 already mentioned, for instance, may be a compressed air pulse counter, the input 521 of which is connected in the control circuit 140B between the limit switch 30A and the valve 142. Since the limit switch 30A supplies a pulse each time the piston rod of the cutting ram 30 is retracted the piece counter 58 only counts the number of elongate web pieces already cut off. Suitably a reverse counter is used as the piece counter 58, on which the number of elongate web pieces to be cut off can be preset and which supplies a compressed-air pulse when the counter shows zero. The counter output 522 is connected to the stop circuit 420 through a shuttle valve 523.

Different piece lengths can be obtained by first moving the limit switch 14B to adjust the stroke of the conveyor ram 14. If this were the only adjustment provided, the piece length would be limited by the maximum travel of the ram 14. In order to remove this limitation there is provided according to the invention a repetition circuit 57,501 to 507. The stroke repetition circuit comprises a four-way valve 506 which is inserted in the control circuit 300B between the valve 421 and the valve 14C. The repetition circuit includes the stroke repetition counter 57 which is a reverse counter on which the number of strokes can be preset and which supplies a compressed-air pulse when the counter shows zero. The input of the stroke repetition counter 57 is connected to the control circuit 140A through a line 501. Therefore, it responds after each complete stroke cycle of the conveyor ram 14. The counter output is connected to the valve 506 through a line 502 and closes the control circuit 300B for the cutting ram 30 as soon as the required number of strokes has been completed. The other output of the valve 506 is connected to the control circuit 140B through a line 504 and a shuttle valve 507. From the control circuit 300A a line 505 is branched off, through which the valve 506 is controlled in such a manner that the control circuit 300B is disconnected from the valve 421 and is connected instead to the branch line 504.

When the pneumatic circuit arrangement of FIG. 3 is to be operated, the piston rods of the rams 30 and 14 are initially retracted as shown. By actuating the starter switch 601 the valve 302 is changed over so that the piston rod of the ram 30 is driven from the position A to the position B. At the same time the valve 421 is also changed over. As soon as the piston rod of the ram 30 has reached the position B and the limit switch 30B has responded, the valve 30D is actuated and the valve 302 is switched back, so that the piston rod of the ram 30 is retracted. When the valve 30D is actuated, the valve 506 is also changed over the control circuit 300B is connected through the line 504 to the valve 507. Simultaneously, the stroke repetition counter 57 is set to the preselected number through line 503.

As soon as the piston rod of the ram 30 has reached the position A and the limit switch 30A has responded, the valve 30C is actuated and the piece counter 58 is reset by one, and the valve 142 is changed over so that the piston rod of the ram 14 moves from the position A to the position B. When the position B is reached and the limit switch 14B responds, the valve 14D is energized and the valve 142 is returned again, so that now the piston rod of the ram 14 is retracted. Simultaneously with the actuation of the limit switch 14B the stroke repetition counter 50 is reset by one through line 501. As soon as the piston rod of the ram 14 has reached the position A and the limit switch 14A has responded, the valve 142 is changed over again through the valve 506, the line 504 and the valve 507, and outward movement of the piston rod of the ram 14 recommences. Since the pilot valve 60 is also actuated a predetermined interval of time after the valve 14C is actuated, the compressed air to the valve 142 through the valves 506 and 507 is blocked by the valve 60 after the valve 142 has been changed over. The piston rod of the ram 14 moves out and in until the stroke repetition counter 57 shows zero. The conveyor roller 12 has then been driven in the corresponding number of steps and has conveyed the elongate web material 34 by a length which will normally exceed the length of the toothed rack 17 and the stroke of the ram 14.

If the stroke repetition counter 57 has reached zero, the valve 506 is reset through the line 502, and the control circuit 300B to the valve 302 is closed, while the branch line 504 is disconnected from the control circuit 300B. Thus, the limit switch 14A does not initiate a further stroke of the ram 14, but changes over the valve 302, as when the apparatus was first started, and initiates a stroke of the cutting ram 30. As a result, a piece of the elongate web material is cut off, the stroke repetition counter 57 is reset to the predetermined number through the limit switch 30B and the line 503, and the above described process is repeated.

If the predetermined number of web pieces has been cut off and consequently the piece counter 58 has reached zero, it supplies a pulse to the valve 421 after the limit switch 30A has responded, and the control circuit 300B is blocked. Accordingly, not only the ram 30, but also the ram 14 is blocked, since the valve 506 is in a position in which it closes the control circuit 300B to the valve 302.

The machine can also be de-energized by the safety switch 42, which also may serve as a usual circuit-breaker.

Although a specific embodiment of the invention has been shown and described, it should be understood that modifications and variations may be made without departing from the scope of the appended claims.

What we claim is:

1. A machine for automatically cutting an elongate material into lengths, comprising:
   (a) a base;
   (b) roller means rotatably mounted on said base for feeding the elongate material a predetermined interval at a time;
   (c) means on said base having a cycle of operation for rotating said roller means an angular amount corresponding to said predetermined interval;
   (d) means on said base for cutting off the elongate material fed by said roller means; and
   (e) means for alternately driving said rotating means and said cutting means and for automatically repeating the operation of said rotating means for a preselected number of cycles before actuation of said cutting means;
   (f) said roller means including a conveyor roller rotatably mounted on said base and an idler roller urged against said conveyor roller, the elongate material being transportable by and between said conveyor and idler rollers:
   (g) said rotating means comprising a first fluid-pressure actuator having on its piston rod a toothed rack, there being a freewheeling pinion on the shaft of said conveyor roller, and said toothed rack being in mesh with said freewheeling pinion;
   (h) said cutting means comprising a second fluid-pressure actuator having on its piston rod a cutter blade which on energization of said second actuator is movable across a passageway through which can pass the elongate material fed by said conveyor and idler rollers; and
   (i) said driving and repeating means comprising a first fluid circuit including a first four-way valve for selecting the direction of movement of the piston rod of said first actuator, and a second fluid circuit including a second four-way valve for selecting the direction of movement of the piston rod of said second actuator, there being a pair of first and second limit switches for sensing the forward and rearward stroke ends, respectively, of the piston rod of said first actuator, and a pair of third and fourth limit switches for sensing the forward and rearward stroke ends, respectively, of the piston rod of said second actuator, said first four-way valve being switchable by said first and fourth limit switches, and said second four-way valve being switchable by said second and third limit switches.

2. A machine according to claim 1, said first limit switch being positionally adjustable in a direction parallel to the piston rod of said first actuator.

3. A machine according to claim 1, said driving and repeating means further comprising a third four-way valve switchable in response to actuation of said third limit switch so as to break said second fluid circuit and to cause said first four-way valve to switch by said first and second limit switches, and a counter for receiving an input each time said first limit switch is actuated and for producing upon reception of a predetermined number of inputs an output for switching back said third four-way valve.

4. A machine according to claim 1, said driving and repeating means further comprising a fourth four-way valve in said second fluid circuit, and a counter for receiving an input each time said fourth limit switch is actuated and for producing upon reception of a predetermined number of inputs an output for switching said fourth four-way valve to break said second fluid circuit.

5. A machine for automatically cutting an elongate material into lengths, comprising: a base; roller means rotatably mounted on said base for feeding the elongate material a predetermined interval at a time; means on said base having a cycle of operation for rotating said roller means an angular amount corresponding to said predetermined interval; means on said base for cutting off the elongate material fed by said roller means; means for alternately driving said rotating means and said cutting means and for cycling said rotating means before actuation of said cutting means; said roller means including a conveyor roller rotatably mounted on said base and an idler roller urged against said conveyor roller, the elongate material being transportable by and between said conveyor and idler rollers; said rotating means comprising a first fluid-pressure actuator having on its piston rod a toothed rack, there being a freewheeling pinion on the shaft of said conveyor roller, and said toothed rack being in mesh with said freewheeling pinion; said cutting means comprising a second fluid-pressure actuator having on its piston rod a cutter blade which on energization of said second actuator is movable across a passageway through which can pass the elongate material fed by said conveyor and idler rollers; said driving and cycling means comprising a first fluid circuit including a first four-way valve for selecting the direction of movement of the piston rod of said first actuator, and a second fluid circuit including a second four-way valve for selecting the direction of movement of the piston rod of said actuator, there being a pair of first and second limit switches for sensing the forward and rearward stroke ends, respectively, of the piston rod of said first actuator, and a pair of third and fourth limit switches for sensing the forward and rearward stroke ends, respectively, of the piston rod of said second actuator, said first four-way valve being switchable by said first and fourth limit switches, and said second four-way valve being switchable by said second and third limit switches; a fourth four-way valve in said second fluid circuit, and a counter for receiving an input each time said fourth limit switch is actuated and for producing upon reception of a predetermined number of inputs an output for switching said fourth four-way valve to break said second fluid circuit; first means for detecting an end of the elongate material before such end arrives at said conveyor roller, and a fifth limt switch actuatable by said first detecting means upon such detection, said fourth four-way valve being switchable to break said second fluid circuit in response to actuation of said fifth limit switch; and second means for detecting relatively rigid portions on the elongate material, said fifth limit switch being actuatable by by said second detecting means upon such detection.

6. A machine according to claim 5, said second detecting means comprising an arm pivoltally mounted on said base and having a ring through which the elongate material can pass while being fed, said arm being spring-biased away from a feeler of said fifth limit switch, and said arm having a portion engageable with said feeler of said fifth limit switch when said ring hinders the passage therethrough of the rigid portions on the elongate material.

7. A machine according to claim 6, said arm being pivotable on a pin, said detecting means comprising a lever pivotably mounted on such base about said pin and having a roll rotatable thereon, said lever being spring-biased to cause said roll to be held against the elongate material being fed, and said lever being engageable with said arm when said lever is pivotally moved upon disengagement of said roll from the elongate material.

* * * * *